United States Patent
Borra et al.

(10) Patent No.: US 12,336,078 B2
(45) Date of Patent: Jun. 17, 2025

(54) SYNCHRONIZING A LIGHT EFFECT AND A SPOKEN DESCRIPTION OF THE LIGHT EFFECT

(71) Applicant: SIGNIFY HOLDING B.V., Eindhoven (NL)

(72) Inventors: Tobias Borra, Rijswijk (NL); Berent Willem Meerbeek, Veldhoven (NL); Dzmitry Viktorovich Aliakseyeu, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 56 days.

(21) Appl. No.: 18/031,428

(22) PCT Filed: Oct. 11, 2021

(86) PCT No.: PCT/EP2021/078029
§ 371 (c)(1),
(2) Date: Apr. 12, 2023

(87) PCT Pub. No.: WO2022/078947
PCT Pub. Date: Apr. 21, 2022

(65) Prior Publication Data
US 2023/0380041 A1    Nov. 23, 2023

(30) Foreign Application Priority Data
Oct. 12, 2020    (EP) .................................... 20201224

(51) Int. Cl.
*G06F 3/16* (2006.01)
*H05B 47/165* (2020.01)

(52) U.S. Cl.
CPC ........... *H05B 47/165* (2020.01); *G06F 3/165* (2013.01)

(58) Field of Classification Search
CPC ..... G06F 3/165; H05B 47/155; H05B 47/165; Y02B 20/40
See application file for complete search history.

(56) References Cited

U.S. PATENT DOCUMENTS

2002/0195975 A1    12/2002    Schanberger et al.
2008/0033256 A1    2/2008     Farhan et al.
(Continued)

FOREIGN PATENT DOCUMENTS

WO    2019234028 A1    12/2019

OTHER PUBLICATIONS

Andrew Godbout et al., Audio Visual Synchronization of Rhythm, Oct. 1, 2015, International Conference on 3D Vision, pp. 589-597 (Year: 2015).*

(Continued)

*Primary Examiner* — Tam T Tran (57) ABSTRACT

A system for adjusting a delay setting based on user input is configured to control playback of an audio segment (51) and control a light source to render a light effect (67). The audio segment comprises a spoken description (54) of the light effect. The audio segment is played back at a playback moment (83). The light effect is rendered at a rendering moment. A difference (85) between the playback moment and the rendering moment depends on a value of the delay setting. The delay setting causes the rendering of the light effect or the playback of the audio segment to be delayed. The system is further configured to receive the user input in response to the playback of the audio segment and the rendering of the light effect and adjust the delay setting based on the user input.

15 Claims, 6 Drawing Sheets

(56) References Cited

U.S. PATENT DOCUMENTS

2018/0049298 A1   2/2018  Benoit
2019/0104593 A1*  4/2019  Aliakseyeu ......... G06F 16/7834
2021/0266626 A1*  8/2021  Kamp ................... H05B 47/105
2022/0039239 A1*  2/2022  Rycroft ................ H05B 47/155

OTHER PUBLICATIONS

Prarthana Shrestha et al., Synchronization of Multiple Camera Videos Using Audio-Visual Features, Jan. 1, 2010, IEEE Transactions on Multimedia, vol. 12, No. 1, pp. 79-92 (Year: 2010).*

* cited by examiner

SYNCHRONIZING A LIGHT EFFECT AND A SPOKEN DESCRIPTION OF THE LIGHT EFFECT

CROSS-REFERENCE TO PRIOR APPLICATIONS

This application is the U.S. National Phase application under 35 U.S.C. § 371 of International Application No. PCT/EP2021/078029, filed on Oct. 11, 2021, which claims the benefit of European Patent Application No. 20201224.1, filed on Oct. 12, 2020. These applications are hereby incorporated by reference herein.

FIELD OF THE INVENTION

The invention relates to a system for adjusting a delay setting based on user input.

The invention further relates to a method of adjusting a delay setting based on use input.

The invention also relates to a computer program product enabling a computer system to perform such a method.

BACKGROUND OF THE INVENTION

Philips' Hue Entertainment and Hue Sync have become very popular among owners of Philips Hue lights. Philips Hue Sync enables the rendering of light effects based on the content that is played on a computer. Initially, Hue Sync was only available as an application for PCs. An HDMI module called the Hue Play HDMI Sync Box was later added to the Hue entertainment portfolio. This device addresses one of the main limitations of Hue Sync and aims at streaming and gaming devices connected to the TV. It makes use of the same principle of an entertainment area and the same mechanisms to transport information. This device is in principle a HDMI splitter which is placed between any HDMI device and a TV.

A dynamic lighting system can dramatically influence the experience and impression of audio-visual material, e.g. when the colors sent to the lights match what would be seen in the composed environment around the screen. However, a dynamic lighting system cannot only be used to enhance screen content, but also to enhance the experience of listening to music, e.g. by using a software algorithm to analyze an audio stream in real-time and create light effects based on certain audio characteristics such as intensity and frequency bands.

An alternative approach is to preprocess music and extract relevant meta data and translate this to a light script specifying light effects. Some of the streaming services offer such metadata. For example, Spotify has a meta data for each song, that includes different audio properties and can be accessed via the Spotify API. The advantage of using metadata for light effects creation is that it does not require access to the audio stream and allows analysis of the data of the complete song instead of relying on the real-time data.

When light effects are used to enhance audio on connected luminaires, it is important that the light effects are in sync with the audio. Especially when e.g. Bluetooth speakers are used, latencies larger than 100 ms may be introduced. Unfortunately, a difference of 100 ms can be enough to be noticeable and may negatively impact the experience. For example, light effects may be intended to be rendered at the same time as auditory effects in an audio segment and depending on the overall latency of the audio segment, it becomes ambiguous whether an auditory effect 'belongs' to a first or a second light effect.

WO 2019/234028 A1 describes a device and method that improve the light experience when a variation in delay of the audio segment would affect the light experience. The device and method achieve this by selecting light effects based on information indicating or affecting a variation in delay. This makes it possible to skip light effects that are sensitive to variations in delay. If the delay between the playback moment of the audio segment and the rendering moments of the light effects can be measured with sufficient accuracy, a buffer may be used to ensure that the light effects are in sync with the audio. However, it is not always possible to measure this delay or to measure this delay with sufficient accuracy.

SUMMARY OF THE INVENTION

It is a first object of the invention to provide a system, which can be used to synchronize audio and light effects without requiring a delay to be measured.

It is a second object of the invention to provide a method, which can be used to synchronize audio and light effects without requiring a delay to be measured.

In a first aspect of the invention, a system for adjusting a delay setting based on user input comprises at least one input interface, at least one control interface, and at least one processor configured to control, via said at least one control interface, playback of an audio segment, said audio segment comprising a spoken description of a light effect, said audio segment being played back at a playback moment, control, via said at least one control interface, a light source to render said light effect, said light effect being rendered at a rendering moment, a difference between said playback moment and said rendering moment depending on a value of said delay setting, said delay setting causing said rendering of said light effect or said playback of said audio segment to be delayed, receive, via said at least one input interface, said user input in response to said playback of said audio segment and said rendering of said light effect, and adjust said delay setting based on said user input.

This system allows the user to quickly and straightforwardly sync light effects to a (possibly delayed) audio segment without requiring a delay to be measured. By using a spoken description of the light effect, it becomes possible to render multiple (different) light effects without a substantial pause (e.g. >10 s) in between. This makes the syncing quicker and more user-friendly. If the spoken description consists of a color-word, such as blue or red, the accompanying light effect is then similarly color coded, making it readily apparent whether the light effects should be delayed or advanced to be in sync with the audio segment.

For example, the system may start playback of an audio segment comprising color-names or other sounds associated with light effects (e.g. red, blue, green, yellow), control rendering of corresponding light effects (e.g. red, blue, green and yellow flashes, subsequently), and allow the user to advance or delay the light effects to get in sync with the audio signal. The audio segment may be especially created for the delay synchronization or may be an existing song that lists colors, for example. The user input may be received via a user interface displayed on a display or via speech input, for example. The adjusted delay setting is typically stored as configuration setting, e.g. for the current combination of lighting system and audio system.

Said user input may be indicative of a new value for said delay setting or of an increase or decrease of a current value of said delay setting, for example. Said spoken description may describe a color of said light effect, an intensity of said light effect, a quantity of flashes of said light effect, a location of said light source, and/or a quantity of light sources on which said light effect is rendered at said rendering moment, for example.

Said audio segment may further comprise an audio signal associated with said spoken description, said audio signal following said spoken description in said audio segment. This may be especially beneficial if the spoken description is somewhat long. Alternatively, the start of the corresponding light effect may be synchronized with the start of the spoken description and the end of the corresponding light effect may be synchronized with the end of the spoken description. However, some users may find it clearer if an audio signal is used to indicate which moment of the audio segment should be in sync with a corresponding light effect. Said audio signal may be a beep, for example.

Said audio signal may immediately follow said spoken description in said audio segment. Said spoken description and said audio signal may be part of the same audio sample, for example. In this case, the system may know that playback of the audio sample (e.g. "red <beep>") has started and that 3.2 seconds after the start of the playback of the audio, the beep occurs and the light effect should be rendered.

Said at least one processor may be configured to determine an estimation of said playback moment and control said light source to render said light effect a specified time after said estimation of said playback moment, said difference between said playback moment and said rendering moment further depending on said specified time. Alternatively, playback of the audio segment may be started in dependence on a light script start time.

Said audio segment may comprise a further spoken description of a further light effect and said at least one processor may be configured to control, via said at least one control interface, said light source and/or a further light source to render said further light effect at a further rendering moment, a difference between said playback moment and said further rendering moment depending on said value of said delay setting. The system is especially beneficial if multiple light effects are rendered and multiple spoken descriptions of these light effects are played back, as the use of a spoken description of a light effect makes it possible to render multiple (different) light effects without a substantial pause in between.

Said audio segment may further comprise an audio signal associated with said spoken description and an audio signal associated with said further spoken description, wherein said audio signal associated with said spoken description and said audio signal associated with said further spoken description follow said spoken description and said further spoken description in said audio segment. For example, the audio segment may comprise "red blue <beep><beep>". This is an alternative to having the audio signal immediately follow the spoken description in the audio segment.

Said at least one processor may be configured to determine an estimation of said playback moment and control said light source and/or said further light source to render said further light effect a further specified time after said estimation of said playback moment, said difference between said playback moment and said further rendering moment further depending on said further specified time. Alternatively, playback of the audio segment may be started in dependence on a light script start time.

Said at least one processor may be configured to control, via said at least one control interface, a second playback of said audio segment, and control, via said at least one control interface, said light source to render said light effect a second time, said light effect being rendered at a second rendering moment said second time, a difference between said playback moment and said second rendering moment depending on a second value of said delay setting.

As a first example, said at least one processor may be configured to adjust said delay setting to said second value based on said user input, receive further user input in response to said second playback of said audio segment and said rendering of said light effect at said second rendering moment, and further adjust said delay setting based on said further user input. By looping the audio segment and corresponding light effects, the user may be allowed to adjust the delay in real-time and then exit the method when he is satisfied with the current delay setting.

As a second example, said user input may be indicative of a selection of one of multiple options, a first option of said multiple options corresponding to said playback of said audio segment and said rendering of said light effect at said rendering moment and a second option of said multiple options corresponding to said second playback of said audio segment and said rendering of said light effect at said second rendering moment and said at least one processor may be configured to adjust said delay setting based on said value of said delay setting if said user input is indicative of said first option and based on said second value of said delay setting if said user input is indicative of said second option. Choosing an option with the best delay setting may be easier for the user than indicating a new value for the delay setting or indicating an increase or decrease of a current value of the delay setting.

Said at least one processor may be configured to determine a type of an audio system used to output said audio segment and determine said value and said second value of said delay setting based on said type of said audio system. This may reduce the number of times the audio segment needs to be played and the corresponding light effects need to be rendered before the user can select an option with an acceptable delay setting.

In a second aspect of the invention, a method of adjusting a delay setting based on user input comprises controlling playback of an audio segment, said audio segment comprising a spoken description of a light effect, said audio segment being played back at a playback moment, controlling a light source to render said light effect, said light effect being rendered at a rendering moment, a difference between said playback moment and said rendering moment depending on a value of said delay setting, said delay setting causing said rendering of said light effect or said playback of said audio segment to be delayed, receiving said user input in response to said playback of said audio segment and said rendering of said light effect, and adjusting said delay setting based on said user input. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for adjusting a delay setting based on user input.

The executable operations comprise controlling playback of an audio segment, said audio segment comprising a spoken description of a light effect, said audio segment being played back at a playback moment, controlling a light source to render said light effect, said light effect being rendered at a rendering moment, a difference between said playback moment and said rendering moment depending on a value of said delay setting, said delay setting causing said rendering of said light effect or said playback of said audio segment to be delayed, receiving said user input in response to said playback of said audio segment and said rendering of said light effect, and adjusting said delay setting based on said user input.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
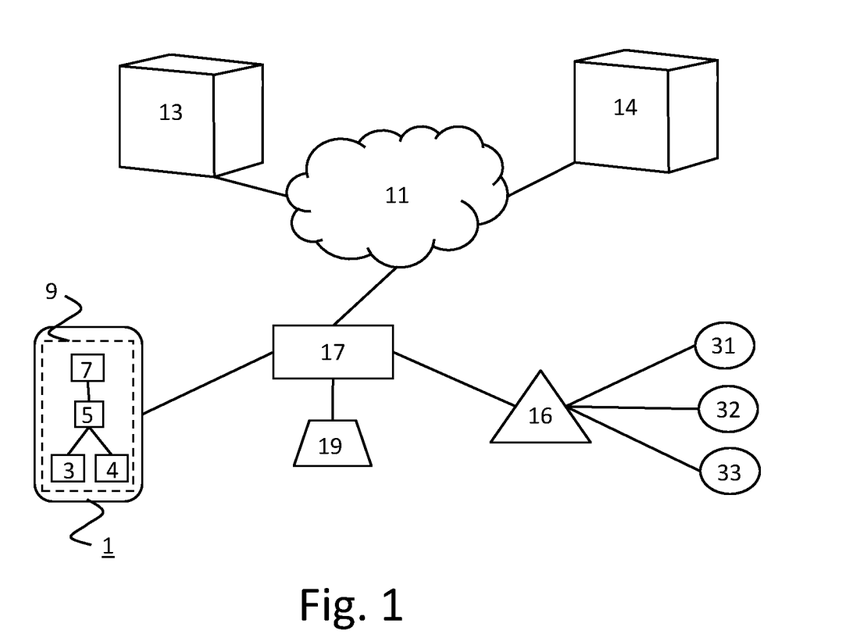
FIG. 1 is a block diagram of a first embodiment of the system.

FIG. 1 shows a first embodiment of the system for adjusting a delay setting based on user input. In this first embodiment, the system is a mobile device 1. Mobile device 1 is able to control lighting devices 31-33 via a wireless LAN access point 17 and a bridge 16, and optionally via an Internet server 13, e.g. of the manufacturer of the lighting devices 31-33. Lighting devices 31-33 may be Philips Hue lamps, for example. The lighting devices 31-33 communicate with the bridge 16, e.g. using Zigbee technology. The bridge 16 may be a Philips Hue bridge, for example. The bridge 16 is connected to the wireless LAN access point 17, e.g. via Wi-Fi or Ethernet.

Mobile device 1 is able to control playback of audio segments, e.g. songs, via an Internet server 14, e.g. of a music streaming service such as Spotify. Mobile device 1 is able to start and stop playback of audio segments available in the music library of the music streaming service and able to determine a current playback moment in the audio segment currently being played back. In the example of FIG. 1, music is streamed to an audio system 19, e.g. a smart and/or Wi-Fi speaker system or an AN receiver. The music system 19 is connected to the wireless LAN access point 17 and streams music directly from the Internet server 14 via Wi-Fi. Alternatively, music may be streamed from a music app running on the mobile device 1 to the music system 19 via Bluetooth. The wireless LAN access point 17 is connected to the Internet 11. The Internet servers 13 and 14 are also connected to the Internet 11. Instead of single Internet servers, clusters of Internet servers may be used. These clusters may be part of one or more clouds.

The mobile device 1 comprises a transceiver 3, a transmitter 4, a processor 5, memory 7, and a touchscreen display 9. The processor 5 is configured to control, via the transmitter 4, playback of an audio segment, e.g. via an API of the Internet server 14. The audio segment comprises a spoken description of a light effect and is played back at a playback moment. The audio segment may be a dedicated audio segment that has been uploaded to the music streaming service, e.g. with agreement of the service provider, or may be an already existing audio segment with appropriate content, e.g. with spoken descriptions of colors (like the song "Sing A Rainbow" by Peggy Lee).

The processor 5 is further configured to control, via the transmitter 4, the lighting device 31 to render a light effect. The light effect is rendered at a rendering moment. A difference between the playback moment and the rendering moment depends on a value of the delay setting. The delay setting causes the rendering of the light effect or the playback of the audio segment to be delayed. Further spoken descriptions and corresponding light effects may also be rendered, e.g. on only lighting device 31, on a different lighting device, or on multiple lighting devices.

The processor 5 is further configured to receive, via the touchscreen display 9 or via a microphone (not shown), user input in response to the playback of the audio segment and the rendering of the light effect(s) and adjust the delay setting based on the user input. The delay setting may be a delay setting of the audio system 19, bridge 16, the lighting device 31 or the mobile device 1 itself, for example. A single delay setting may be adjusted, or multiple delay settings may be adjusted.

The adjustment of the delay setting is performed to improve the synchronization between audio and corresponding light effects, which may for example be determined based on metadata obtained from the Internet server 14. A typical use case would be a user connecting to smart speakers at home, where connection to the smart speakers introduces a noticeable delay. A typical delay might be e.g. 2-3 seconds.

When the user is satisfied with the delay setting, the delay setting may be stored for later use, e.g. in memory 7 or on the Internet server 13, and/or it may be stored as configuration setting in the audio system 19, bridge 16, or the lighting device 31, for example. If the delay setting is stored for later use, it may be stored in relation to the current combination of lighting system and audio system, for example.

The audio segment comprises a spoken description of a light effect. The spoken description describes a color of the light effect, an intensity of the light effect, a quantity of flashes of the light effect, a location of the lighting device 31, and/or a quantity of light sources on which the light effect is rendered (one in this example). For example, the spoken description could be "red", "two green", "dining lamp blue", "left lamp", or "red on the left". If the utterance is somewhat long, a follow up short beep could be used for alignment purposes.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor of the mobile device 1 may run an Android or iOS operating system for example. The display 9 may comprise an LCD or OLED display panel, for example. The processor 5 may use touch screen display 9 to provide a user interface, for example. The memory 7 may comprise one or more memory units. The memory 7 may comprise solid state memory, for example.

The receiver 3 and the transmitter 4 may use one or more wireless communication technologies, e.g. Wi-Fi (IEEE 802.11) for communicating with the wireless LAN access point 17, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of FIG. 1, the lighting devices 31-33 are controlled by the mobile device 1 via the bridge 16. In an alternative embodiment, one or more of the lighting devices 31-33 are controlled by the mobile device 1 without a bridge, e.g. directly via Bluetooth or via the wireless LAN access point 17. Optionally, the lighting devices 31-33 are controlled via the cloud, e.g. via Internet server 13. The lighting devices 31-33 may be capable of receiving and transmitting Wi-Fi signals, for example.

Figure 2:
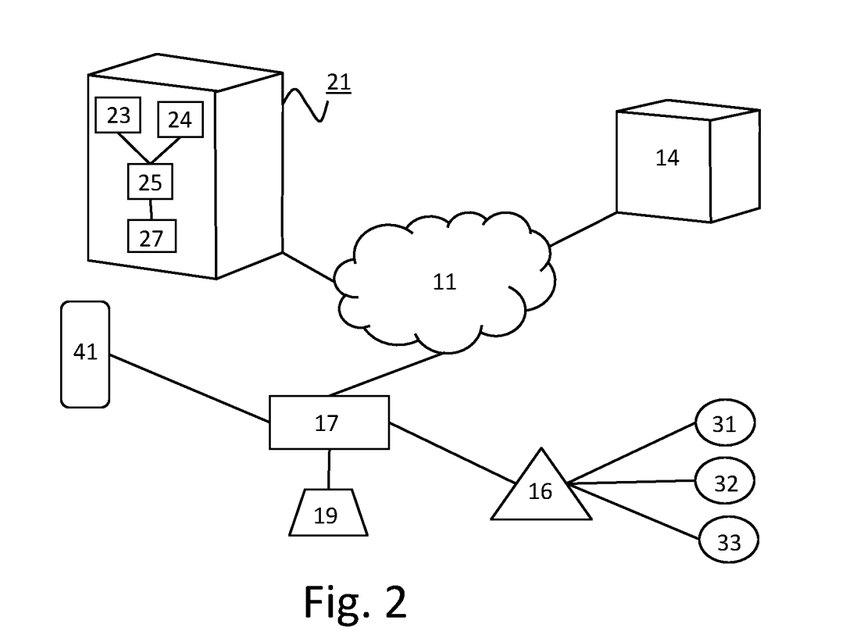
FIG. 2 is a block diagram of a second embodiment of the system.

FIG. 2 shows a second embodiment of the system for adjusting a delay setting based on user input. In this second embodiment, the system is a computer 21. The computer 21 is connected to the Internet 11 and acts as a server. The computer 21 may be operated by a lighting company, for example. In the embodiment of FIG. 2, the computer 21 is able to control the lighting devices 31-33 via the wireless LAN access point 17 and the bridge 16 and able to communicate with the Internet server 14 of a music streaming service.

The computer 21 comprises a receiver 23, a transmitter 24, a processor 25, and storage means 27. The processor 25 is configured to control, via the transmitter 24, playback of an audio segment, e.g. via an API of the Internet server 14. The audio segment comprises a spoken description of a light effect and is played back at a playback moment.

The processor 25 is further configured to control, via the transmitter 24, the lighting device 31 to render a light effect. The light effect is rendered at a rendering moment. A difference between the playback moment and the rendering moment depends on a value of the delay setting. The delay setting causes the rendering of the light effect or the playback of the audio segment to be delayed.

The processor 25 is further configured to receive, e.g. from a mobile device 41 or from audio system 19, user input in response to the playback of the audio segment and the rendering of the light effect and adjust the delay setting based on the user input. The delay setting may be a delay setting of the audio system 19, bridge 16, the lighting device 31 or the computer 21 itself, for example.

In the embodiment of the computer 21 shown in FIG. 2, the computer 21 comprises one processor 25. In an alternative embodiment, the computer 21 comprises multiple processors. The processor 25 of the computer 21 may be a general-purpose processor, e.g. from Intel or AMD, or an application-specific processor. The processor 25 of the computer 21 may run a Windows or Unix-based operating system, for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to communicate with the wireless LAN access point 17, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The computer 21 may comprise other components typical for a computer such as a power connector. The invention may be implemented using a computer program running on one or more processors.

In the embodiment of FIG. 2, the computer 21 receives data from and transmits data to the lighting devices 31-33 via the bridge 16. In an alternative embodiment, the computer 21 receives data from and transmits data to one or more of the lighting devices 31-33 without a bridge.

Figure 3:
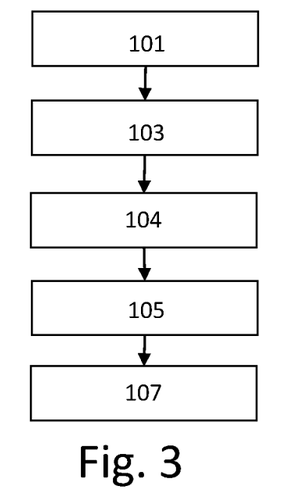
FIG. 3 is a flow diagram of a first embodiment of the method.

A first embodiment of the method of adjusting a delay setting based on user input is shown in FIG. 3. A step 101 comprises controlling playback of an audio segment. The audio segment is played back at a playback moment. The audio segment comprising a spoken description of a light effect and a further spoken description of a further light effect. The spoken descriptions describe a color of the light effects, an intensity of the light effects, a quantity of flashes of the light effects, a location of the light source(s) on which the light effects are rendered in steps 103 and 104, and/or a quantity of light sources on which the light effects are rendered in steps 103 and 104.

For example, the spoken descriptions may consist of color-names, preferably names of colors that many people recognize, e.g. the four primary colors (red, green, blue and yellow) and not a color like "Egyptian". Bursts may be used for e.g. the color blind, where the spoken descriptions may comprise e.g. the utterances "one", "two" and "three", accompanied by e.g. the corresponding number of white flashes on the light source. The spoken descriptions may comprise objects names that describe the light effects if the light effects are rendered on pixelated light sources like a matrix LED panel, where the object, e.g. a character, can be visualized. Examples of such spoken descriptions are "A", "B", "C" or "Cross", "Plus", and "Minus".

Step 103 comprises controlling a light source to render the light effect. The light effect is rendered at a rendering moment. A difference between the playback moment and the rendering moment depends on a value of the delay setting. The delay setting causes the rendering of the light effect or the playback of the audio segment to be delayed.

Step 104 comprises controlling the light source and/or a further light source to render the further light effect at a further rendering moment. The lights effects may comprise the above-mentioned colors, flashes, or objects, for example. A difference between the playback moment and the further rendering moment depends on the value of the delay setting. In the embodiment of FIG. 3, two light effects are rendered. In an alternative embodiment, more or less than two light effects are rendered.

A step 105 comprises receiving the user input in response to the playback of the audio segment and the rendering of the light effects. The user input may be indicative of a new value for the delay setting or of an increase or decrease of a current value of the delay setting, for example. A step 107 comprises adjusting the delay setting based on the user input. Thus, steps 105 and 107 allow the user to advance or delay the light effects to be in sync with the audio or to advance or delay the audio to be in sync with the light effects.

Figure 4:
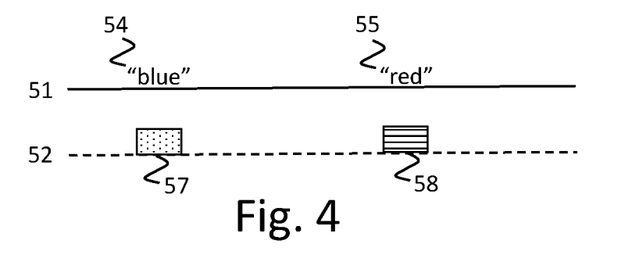
FIG. 4 shows a first example of an audio segment and corresponding light effects.

FIG. 4 shows a first example of an audio segment and corresponding light effects. The audio segments 51 comprises a spoken description 54 and a further spoken description 55. A sequence of light effects 52 is rendered in parallel. The spoken description 54 describes the color of the light effect 57: blue. The further spoken description 55 describes the color of the further light effect 58: red. The light effect 57 is started at the start of the spoken description 54 and terminated at the end of the spoken description 54. The further light effect 58 is started at the start of the further spoken description 55 and terminated at the end of the further spoken description 55.

Figure 5:
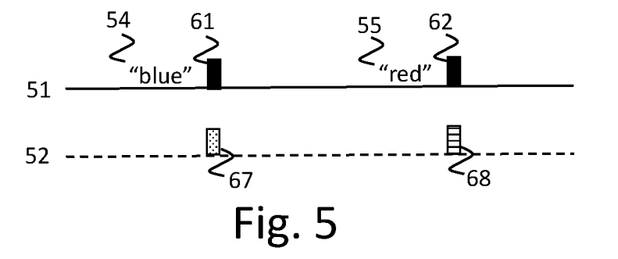
FIG. 5 shows a second example of an audio segment and corresponding light effects.

FIG. 5 shows a second example of an audio segment and corresponding light effects. In this second example, the audio segment 51 further comprises an audio signal 61 associated with the spoken description 54 and an audio signal 62 associated with the further spoken description 55. The audio signals 61 and 62 may be short beeps, for example. The audio signal 61 immediately follows the spoken description 54 in the audio segment 51. The audio signal 62 immediately follows the further spoken description 55 in the audio segment 51. The user may be asked to synchronize the light effects to the beeps following the color-names, for example.

The audio signals 61 and 62 are relatively short compared to the spoken descriptions 54 and 55. The light effect 67 and the further light effect 68 are also relatively short and shorter than the light effects 57 and 58 of FIG. 4. The light effect 67 and the further light effect 68 are intended to be rendered at the same time as the spoken description 54 and further spoken description 55, respectively, and have the same duration as these spoken descriptions.

Figure 6:
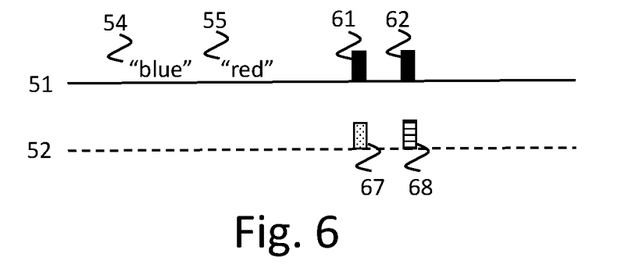
FIG. 6 shows a third example of an audio segment and corresponding light effects.

FIG. 6 shows a third example of an audio segment and corresponding light effects. Compared to the example of FIG. 5, the audio signal 61 associated with the spoken description 54 and the audio signal 62 associated with the further spoken description 55 now both follow the spoken description 54 and the further spoken description 55 in the audio segment 51.

Figure 7:
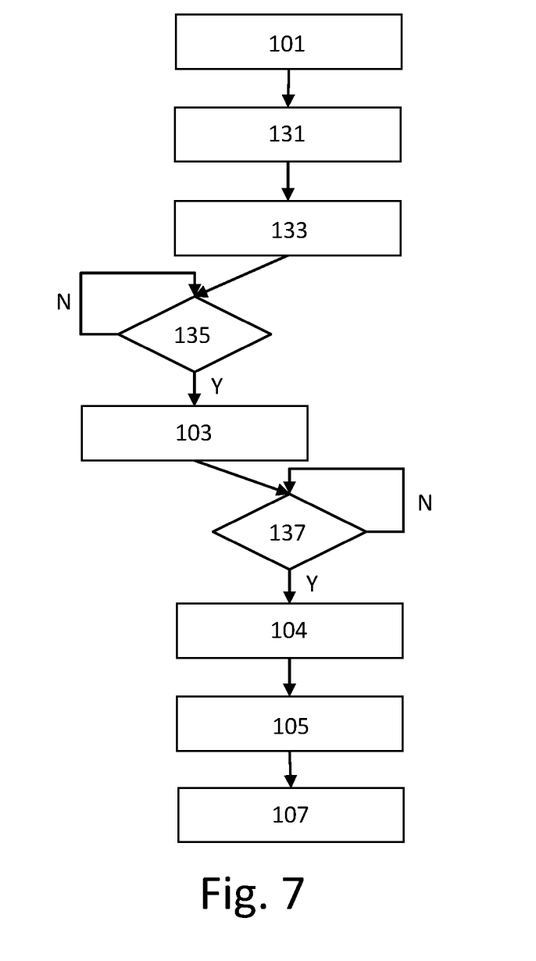
FIG. 7 is a flow diagram of a second embodiment of the method.

A second embodiment of the method of adjusting a delay setting based on user input is shown in FIG. 7. Step 101 comprises controlling playback of an audio segment, e.g. via a music service API. The audio segment is played back at a playback moment. The audio segment comprises a spoken description of a light effect and a further spoken description of a further light effect.

A step 131 comprises determining an estimation of the playback moment, e.g. based on information received via the music service API. A step 133 comprises determining a first timer which lapses a specified time after the estimation of the playback moment and a second timer which lapses a further specified time after the estimation of the playback moment. The first timer lapses before the second timer. A step 135 comprises determining whether the first timer has lapsed. If not, step 135 is repeated until the first timer lapses. When it is determined in step 135 that the first timer has lapsed, step 103 is performed.

Step 103 comprises controlling a light source to render the light effect. The light effect is rendered at a rendering moment. A difference between the playback moment and the rendering moment depends on a value of the delay setting and the specified time. The delay setting causes the rendering of the light effect or the playback of the audio segment to be delayed.

A step 137 comprises determining whether the second timer has lapsed. If not, step 137 is repeated until the second timer lapses. When it is determined in step 137 that the second timer has lapsed, step 104 is performed. Step 104 comprises controlling the light source and/or a further light source to render the further light effect at a further rendering moment. A difference between the playback moment and the further rendering moment depends on the value of the delay setting and the further specified time.

Next, step 105 comprises receiving the user input in response to the playback of the audio segment and the rendering of the light effects. The user input may be indicative of a new value for the delay setting or of an increase or decrease of a current value of the delay setting, for example. Step 107 comprises adjusting the delay setting based on the user input. In the embodiment of FIG. 7, two light effects are rendered. In an alternative embodiment, more or less than two light effects are rendered.

Figure 8:
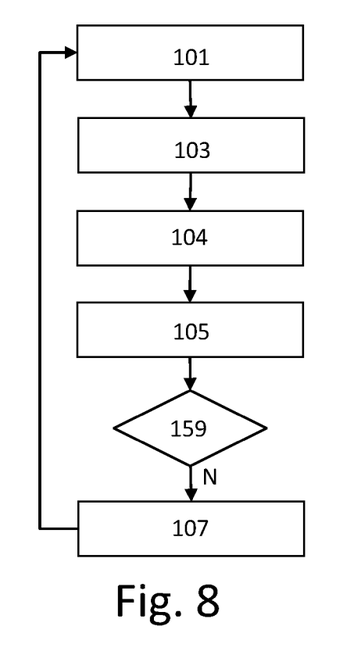
FIG. 8 is a flow diagram of a third embodiment of the method.

A third embodiment of the method of adjusting a delay setting based on user input is shown in FIG. 8. This third embodiment is an extension of the first embodiment of FIG. 3. In the embodiment of FIG. 8, the user input received in step 105 is indicative of whether the user is satisfied with the current delay setting. If the user input indicates that the user is not satisfied with the current delay setting, the user input may further indicate a new value for the delay setting or of an increase or decrease of a current value of the delay setting.

A step 159 is performed after step 105. Step 159 comprises determining whether the user has indicated that he is satisfied with the current delay setting based on the user input received in step 105. If it is determined in step 159 that the user has indicated that he is satisfied with the current delay setting, the method terminates. If it is determined in step 159 that the user has indicated that he is not satisfied with the current delay setting, step 107 is performed. Step 107 comprises adjusting the delay setting based on the user input. In step 107, the delay setting is adjusted to a new value, e.g. the new value indicated in the user input or a new value obtained by increasing or decreasing the current value of the delay setting. Step 101 is repeated after step 107 and the method then proceeds as shown in FIG. 8.

In the next iteration of step 103, the next light effect is rendered at a next rendering moment. In the next iteration of step 104, the next further light effect is rendered at a next further rendering moment. A difference between the playback moment and the next rendering moment and a difference between the playback moment and the next further rendering moment depend on the new value of the delay setting. In the embodiment of FIG. 8, two light effects are rendered. In an alternative embodiment, more or less than two light effects are rendered.

When the user is satisfied with the delay setting, the delay setting may be stored for later use and/or it may be stored as configuration setting, e.g. in the audio system on which the audio segment is rendered or in the lighting system that comprises the light source(s), for example. If the delay setting is stored for later use, it may be stored in relation to the current combination of lighting system and audio system, for example.

Figure 9:
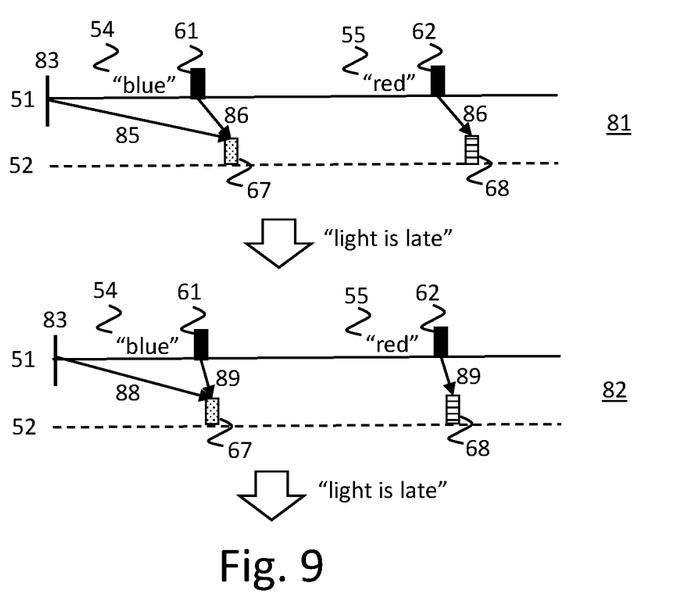
FIG. 9 exemplifies the performance of the method of FIG. 8.

FIG. 9 illustrates the performance of the method of FIG. 8. In the example of FIG. 9, the audio segment 51 and corresponding light effects 67 and 68 shown in FIG. 5 are rendered. In a first iteration of steps 103 and 104 of FIG. 8, at a moment 81, the light effects 67 and 68 are rendered using a first value of the delay setting. A difference 85 between the playback moment 83 and the rendering moment of the light effect 67 depends on the first value of the delay setting. This first value of the delay setting results in a delay 86 between the rendering of the audio signal 61 and the rendering of the light effect 67 and between the rendering of the audio signal 62 and the rendering of the light effect 68.

Then, in step 105, the user indicates that he is not satisfied with the current delay setting, i.e. with the first value of the delay setting, and that the light is late compared to the audio. In step 107, a second value of the delay setting is obtained by decreasing the current value of the delay setting, e.g. with a fixed value or with a user-indicated value. As a result, the second value of the delay setting is lower than the first value.

In a second iteration of steps 103 and 103 of FIG. 8, at a moment 82, the light effects 67 and 68 are rendered using the second value of the delay setting. A difference 88 between the playback moment 83 and the rendering moment of the light effect 67 depends on the second value of the delay setting. This second value of the delay setting results in a delay 89 between the rendering of the audio signal 61 and the rendering of the light effect 67 and between the rendering of the audio signal 62 and the rendering of the light effect 68.

Difference 88 is smaller than difference 85 and delay 89 is smaller than delay 86 due to the user input in step 105. However, in the second iteration of step 105, the user indicates that he is (still) not satisfied with the current delay setting, i.e. with the second value of the delay setting, and that the light is still late compared to the audio. Step 107, 101, 103, 104, 105, and 159 are repeated until the user is satisfied with the delay setting.

Figure 10:
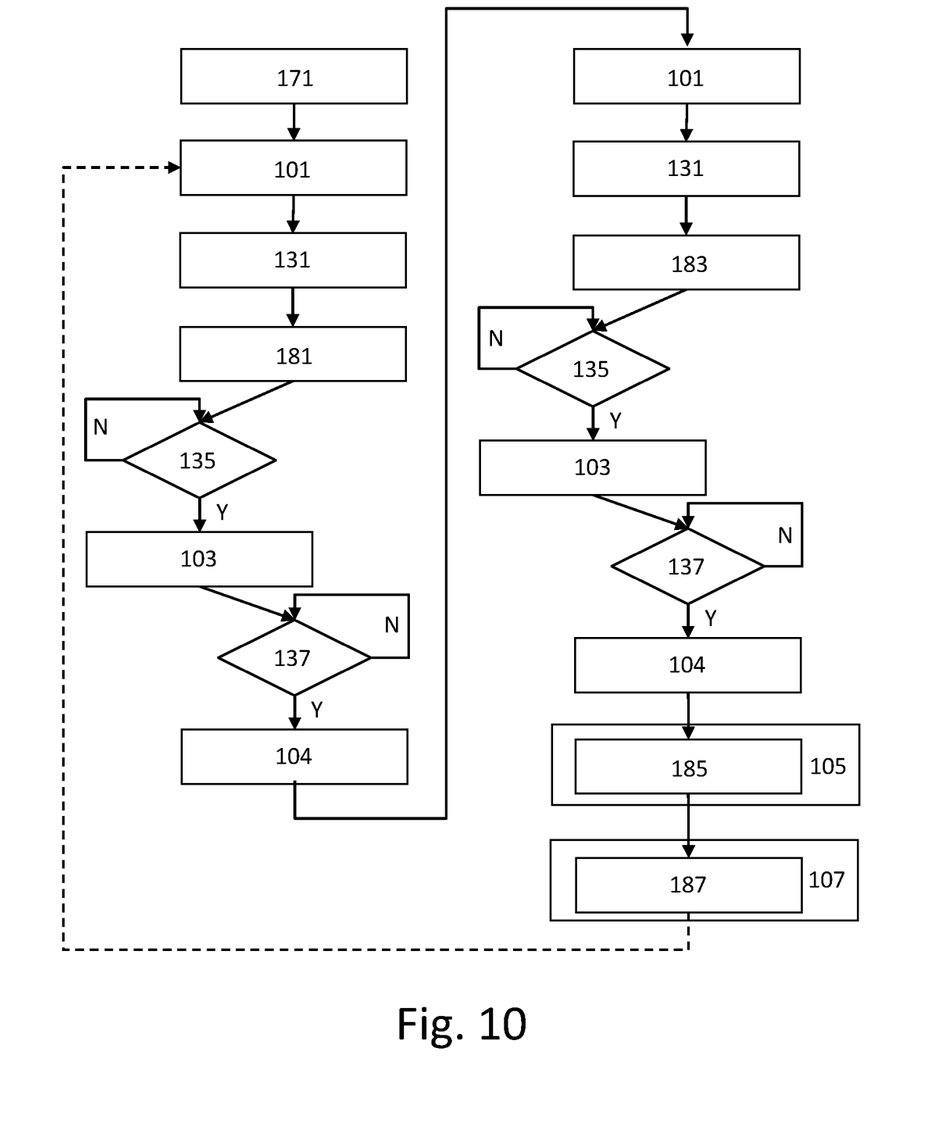
FIG. 10 is a flow diagram of a fourth embodiment of the method.

A fourth embodiment of the method of adjusting a delay setting based on user input is shown in FIG. 10. This fourth embodiment is an extension of the second embodiment of FIG. 7. A step 171 comprises determining a type of an audio system used to output the audio segment. Step 101 comprises controlling playback of an audio segment, e.g. via a music service API. The audio segment is played back at a playback moment. The audio segment comprises a spoken description of a light effect and a further spoken description of a further light effect. Step 131 comprises determining an estimation of the playback moment, e.g. based on information received via the music service API.

A step 181 comprises determining a first timer which lapses a specified time after the estimation of the playback moment and a second timer which lapses a further specified time after the estimation of the playback moment while adding a delay corresponding to a first value of the delay setting. The first value of the delay setting corresponds to a first option and is determined based on the type of the audio system determined in step 171. The first timer lapses before the second timer.

The delay may be added by temporarily adjusting the delay setting or by temporarily adjusting another delay setting, for example. As an example of the latter, a delay setting of an app running on a mobile device, which performs the method, may be temporarily adjusted, even though the method is used to adjust a delay setting applied on a light bridge or lighting device.

Step 135 comprises determining whether the first timer has lapsed. If not, step 135 is repeated until the first timer lapses. When it is determined in step 135 that the first timer has lapsed, step 103 is performed. Step 103 comprises controlling a light source to render the light effect. The light effect is rendered at a rendering moment. A step 137 comprises determining whether the second timer has lapsed. If not, step 137 is repeated until the second timer lapses. When it is determined in step 137 that the second timer has lapsed, step 104 is performed. Step 104 comprises controlling the light source and/or a further light source to render the further light effect at a further rendering moment.

After step 104 has been performed, steps 101, 131, 135, 103, 137 and 104 are performed again. However, instead of step 181, a step 183 is performed between steps 131 and 135. Step 183 comprises determining a first timer which lapses a specified time after the estimation of the playback moment and a second timer which lapses a further specified time after the estimation of the playback moment while adding a delay corresponding to a second value of the delay setting. The second value of the delay setting corresponds to a second option and is determined based on the type of the audio system determined in step 171. The first timer lapses before the second timer. In the embodiment of FIG. 10, two light effects are rendered. In an alternative embodiment, more or less than two light effects are rendered.

Step 105 comprises receiving the user input in response to the playbacks of the audio segment and the rendering of the light effects. In the embodiment of FIG. 10, step 105 is implemented by a step 185. In step 185, the received user input is indicative of a selection of one of the two options. In the embodiment of FIG. 10, the user is only able to select one of two options in step 185. In an alternative embodiment, the user can select from more than two options in step 185.

Step 107 comprises adjusting the delay setting based on the user input. In the embodiment of FIG. 10, step 107 is implemented by a step 187. Step 187 comprises adjusting the delay setting based on the first value of the delay setting if the user input is indicative of the first option and based on the second value of the delay setting if the user input is indicative of the second option.

After step 107, step 101 may be repeated, and the method then proceeds as shown in FIG. 10. At least one of the first and second values of the delay setting used in steps 181 and 183 are different in this next iteration. These one or two different values are determined based on at least one of the first and second values of the delay setting used in the previous iteration of steps 181 and 183.

Thus, a system performing the method of FIG. 10 might first identify a type of audio system (that often has a known delay), and then present a user with two or more sequences of light effects with different delays and ask a user to pick one where the perceived delay was absent or shorter. This step may be repeated a few times before the user is satisfied with the result.

Figure 11:
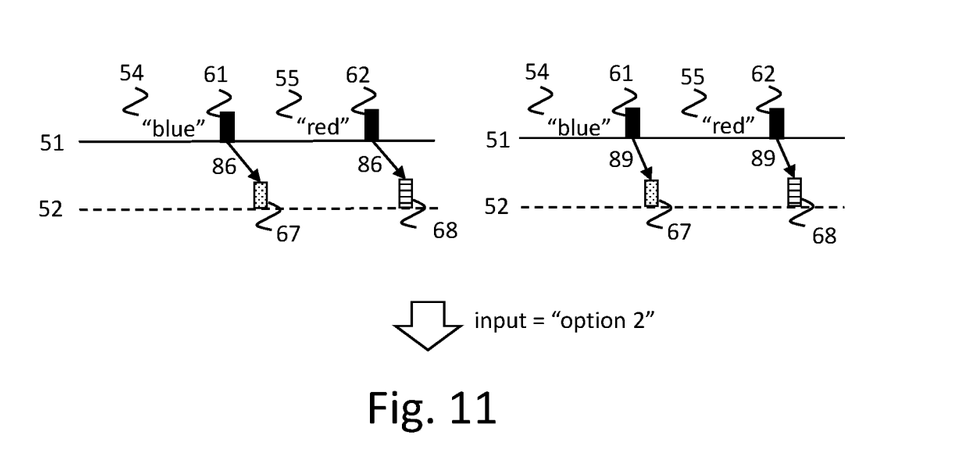
FIG. 11 exemplifies the performance of the method of FIG. 10.

FIG. 11 illustrates the performance of the method of FIG. 10. In the example of FIG. 11, the audio segment 51 and corresponding light effects 67 and 68 shown in FIG. 5 are rendered. The audio segment 51 is rendered twice. The corresponding light effects 67 and 68 are also rendered twice with different values of the delay setting. This first value of the delay setting results in a delay 86 between the rendering of the audio signal 61 and the rendering of the light effect 67 and between the rendering of the audio signal 62 and the rendering of the light effect 68.

The second value of the delay setting results in a delay 89 between the rendering of the audio signal 61 and the rendering of the light effect 67 and between the rendering of the audio signal 62 and the rendering of the light effect 68. Then, in step 105, the user indicates which of the two options he prefers, i.e. whether he prefers the first value of the delay setting or the second value of the delay setting. In the example of FIG. 11, the user selects option 2. These steps may be repeated one or more times, e.g. until the user is satisfied with the delay setting.

The embodiments of FIGS. 3, 7, 8 and 10 differ from each other in multiple aspects, i.e. multiple steps have been added or replaced. In variations on these embodiments, only a subset of these steps is added or replaced and/or one or more steps is omitted. As a first example, step 171 may be omitted from the embodiment of FIG. 10 and steps 131-137 of FIG. 7 may be added to the embodiment of FIG. 8.

Figure 12:
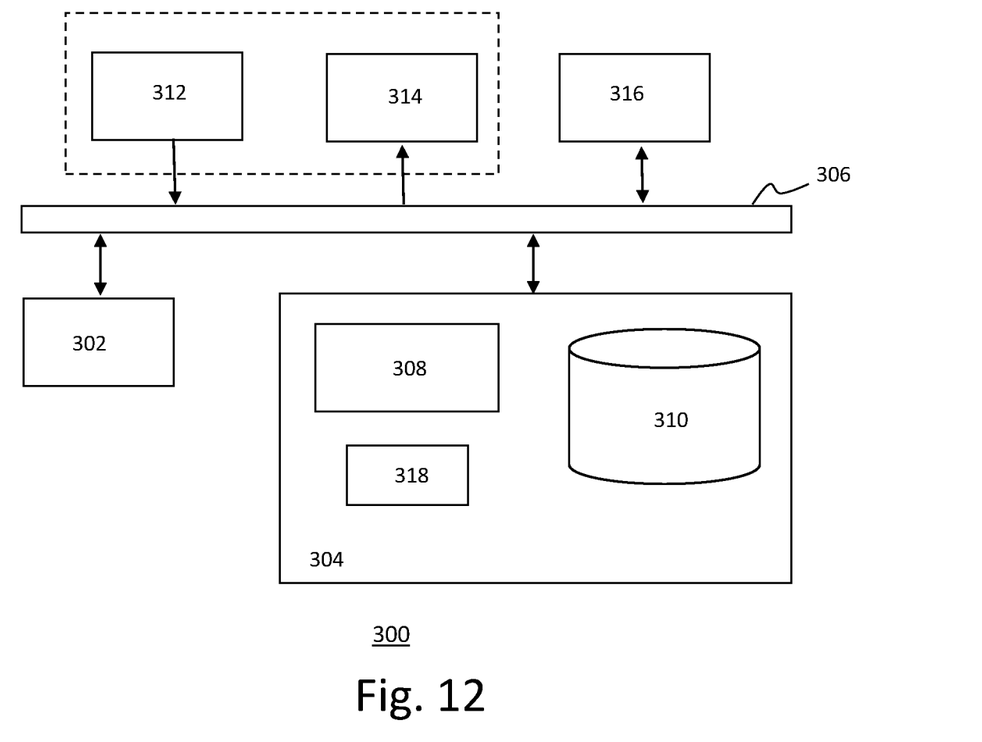
FIG. 12 is a block diagram of an exemplary data processing system for performing the method of the invention.

FIG. 12 depicts a block diagram illustrating an exemplary data processing system that may perform the method as described with reference to FIGS. 3, 7, 8 and 10.

As shown in FIG. 12, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification. The data processing system may be an Internet/cloud server, for example.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like.

Input and/or output devices may be coupled to the data processing system either directly or through intervening I/O controllers.

In an embodiment, the input and the output devices may be implemented as a combined input/output device (illustrated in FIG. 12 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 12, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 12) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for adjusting a delay setting based on user input, said system comprising:
at least one input interface;
at least one control interface; and
at least one processor configured to:
control, via said at least one control interface, playback of an audio segment, said audio segment comprising a spoken description of a light effect, said audio segment being played back at a playback moment,
control, via said at least one control interface, a light source to render said light effect, said light effect being rendered at a rendering moment, a difference between said playback moment and said rendering moment depending on a value of said delay setting, said delay setting causing said rendering of said light effect or said playback of said audio segment to be delayed,
receive, via said at least one input interface, said user input in response to said playback of said audio segment and said rendering of said light effect, and
adjust said delay setting based on said user input.

2. The system of claim 1, wherein said audio segment further comprises an audio signal associated with said spoken description, said audio signal following said spoken description in said audio segment.

3. The system of claim 2, wherein said audio signal immediately follows said spoken description in said audio segment.

4. The system of claim 1, wherein said at least one processor is configured to determine an estimation of said playback moment and control said light source to render said light effect a specified time after said estimation of said playback moment, said difference between said playback moment and said rendering moment further depending on said specified time.

5. The system of claim 1, wherein said audio segment comprises a further spoken description of a further light effect and said at least one processor is configured to control, via said at least one control interface, said light source and/or a further light source to render said further light effect at a further rendering moment, a difference between said playback moment and said further rendering moment depending on said value of said delay setting.

6. The system of claim 5, wherein said audio segment further comprises an audio signal associated with said spoken description and an audio signal associated with said further spoken description, wherein said audio signal associated with said spoken description and said audio signal associated with said further spoken description follow said spoken description and said further spoken description in said audio segment.

7. The system of claim 5, wherein said at least one processor is configured to determine an estimation of said playback moment and control said light source and/or said further light source to render said further light effect a further specified time after said estimation of said playback moment, said difference between said playback moment and said further rendering moment further depending on said further specified time.

8. The system of claim 1, wherein said at least one processor is further configured to:

control, via said at least one control interface, a second playback of said audio segment, and
control, via said at least one control interface, said light source to render said light effect a second time, said light effect being rendered at a second rendering moment said second time, a difference between said playback moment and said second rendering moment depending on a second value of said delay setting.

9. The system of claim 8, wherein said at least one processor is further configured to:
adjust said delay setting to said second value based on said user input,
receive further user input in response to said second playback of said audio segment and said rendering of said light effect at said second rendering moment, and
further adjust said delay setting based on said further user input.

10. The system of claim 8, wherein said user input is indicative of a selection of one of multiple options, a first option of said multiple options corresponding to said playback of said audio segment and said rendering of said light effect at said rendering moment and a second option of said multiple options corresponding to said second playback of said audio segment and said rendering of said light effect at said second rendering moment and said at least one processor is configured to adjust said delay setting based on said value of said delay setting if said user input is indicative of said first option and based on said second value of said delay setting if said user input is indicative of said second option.

11. The system of claim 10, wherein said at least one processor is configured to determine a type of an audio system used to output said audio segment and determine said value and said second value of said delay setting based on said type of said audio system.

12. The system of claim 1, wherein said user input is indicative of a new value for said delay setting or of an increase or decrease of a current value of said delay setting.

13. The system of claim 1, wherein said spoken description describes a color of said light effect, an intensity of said light effect, a quantity of flashes of said light effect, a location of said light source, and/or a quantity of light sources on which said light effect is rendered at said rendering moment.

14. A method of adjusting a delay setting based on user input, said method comprising:
controlling playback of an audio segment, said audio segment comprising a spoken description of a light effect, said audio segment being played back at a playback moment;
controlling a light source to render said light effect, said light effect being rendered at a rendering moment, a difference between said playback moment and said rendering moment depending on a value of said delay setting, said delay setting causing said rendering of said light effect or said playback of said audio segment to be delayed;
receiving said user input in response to said playback of said audio segment and said rendering of said light effect; and
adjusting said delay setting based on said user input.

15. A non-transitory computer-readable medium on which are stored a plurality of non-transitory computer-readable instructions that when executed on a processor are configured to perform steps comprising the method of claim 14.

* * * * *